W. J. BRITTON.
GAGE BOX DISTRIBUTER.
APPLICATION FILED MAY 3, 1916.
1,265,168.
Patented May 7, 1918.
2 SHEETS—SHEET 2.
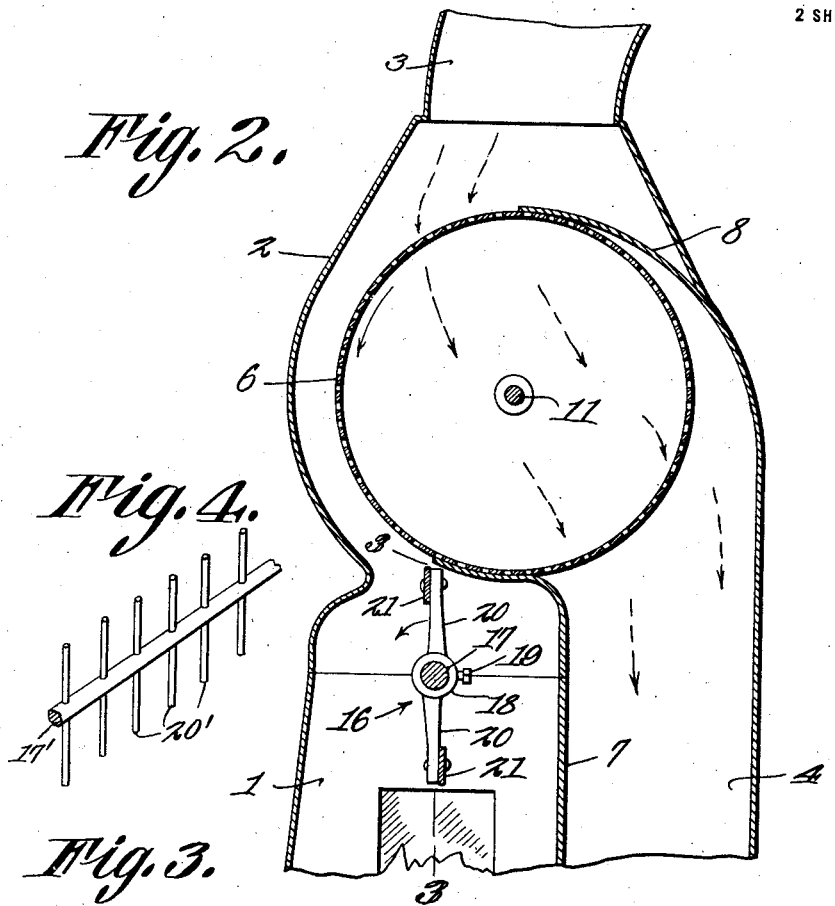
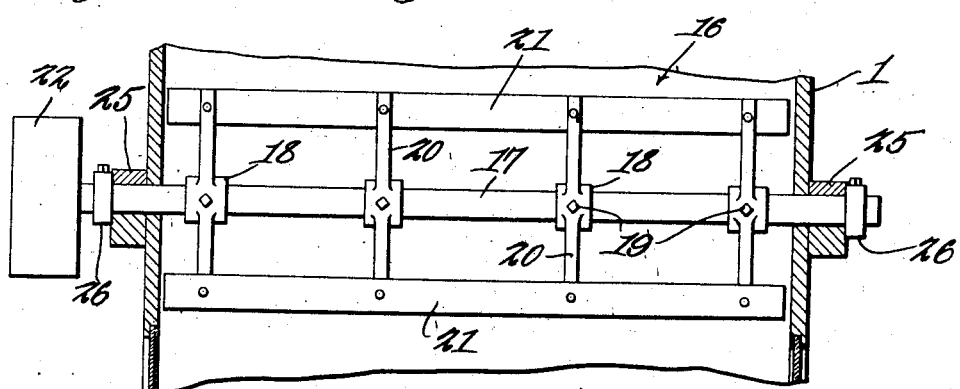
Witnesses
W. J. Britton
Inventor
by C. A. Snow & Co.
Attorneys.

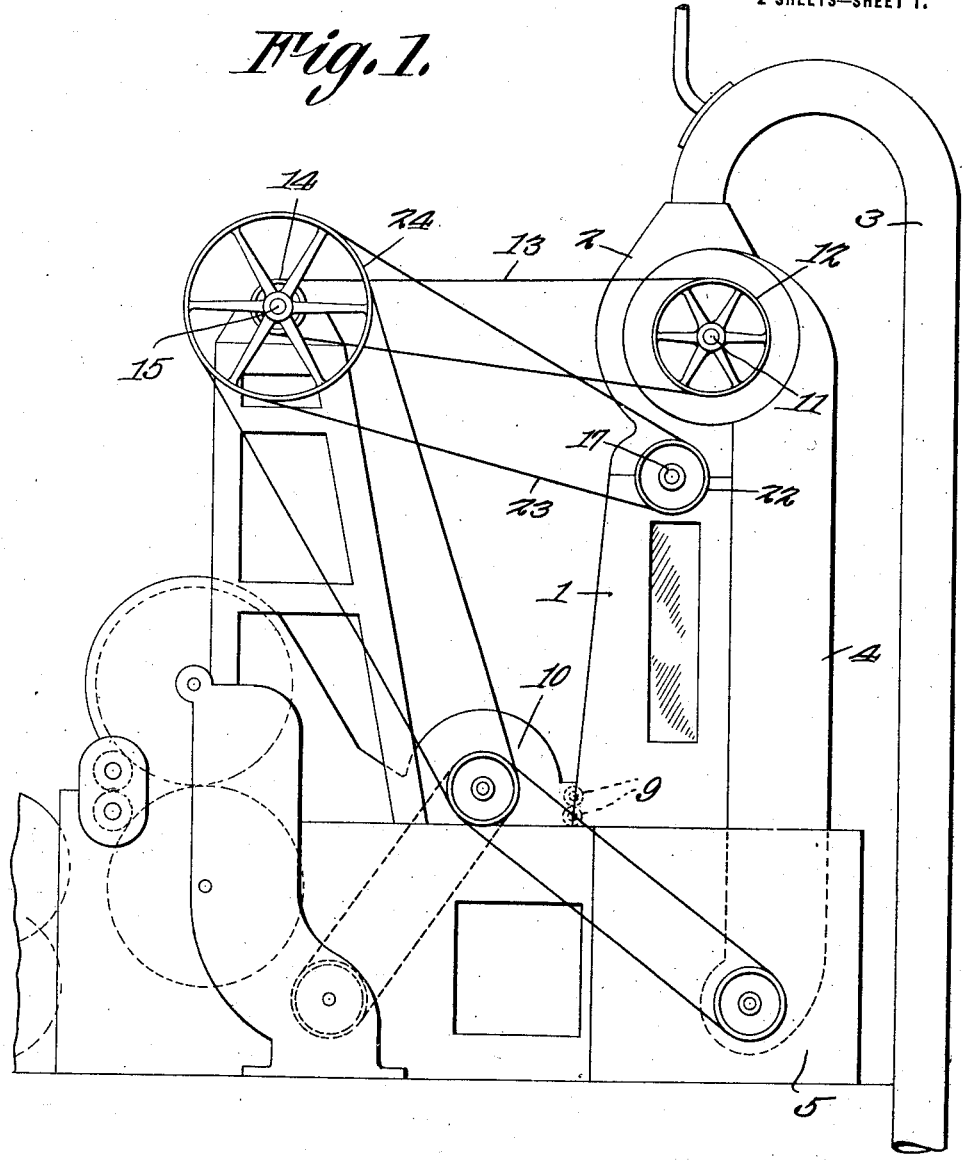

UNITED STATES PATENT OFFICE.

WALTER JAMES BRITTON, OF SPARTANBURG, SOUTH CAROLINA.

GAGE-BOX DISTRIBUTER.

1,265,168.  Specification of Letters Patent.  Patented May 7, 1918.

Application filed May 3, 1916. Serial No. 95,240.

*To all whom it may concern:*

Be it known that I, WALTER J. BRITTON, a citizen of the United States, residing at Spartanburg, in the county of Spartanburg and State of South Carolina, have invented a new and useful Gage-Box Distributer, of which the following is a specification.

The device forming the subject-matter of the present invention is one adapted to be used in connection with what is known in the art as a condenser and gage box for cotton pickers, and it is the object of the invention to provide novel means for distributing the cotton evenly within the gage box which drops from the screen at the upper end thereof, whereby the cotton will pass evenly through the feed rolls from the lower end of the gage box.

Ordinarily, the cotton in dropping into the gage box from the screen, drops in irregular pieces or lumps, and does not distribute evenly for the feed rolls to take the cotton through to the beater of the picker. These lumps and the uneven distribution in the gage box produces thick and thin places in the finished sheet of cotton produced by the picker, whereas with the use of the present distributer, the cotton is broken into small flakes within the gage box and distributed to an even density, whereby the cotton is spread evenly in the gage box. This insures an even sheet of cotton passing through the feed rolls, whereby the cotton in its finished state will be superior to that now produced.

It is also the object of the invention to provide a distributer for the purpose indicated which is extremely simple and inexpensive in construction, which can be applied to various cotton machines, and which will serve its office in a thoroughly practical and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a side elevation of a cotton picking machine having the invention applied thereto.

Fig. 2 is an enlarged vertical section illustrating the screen and upper portion of the gage box with the distributer in place.

Fig. 3 is a vertical section on the line 3—3 of Fig. 2 illustrating the distributer.

Fig. 4 is a perspective view of a modification.

The machine embodies an upright gage box 1 and a screen housing or casing 2 at the upper end of the gage box, a cotton conduit 3 being connected to the upper portion of the housing 2 to convey the cotton by air suction into the housing. Adjacent the gage box 1 is a vertical conduit 4 leading upwardly from an air suction pump 5 and connected to the housing 2, a rotatable cylindrical screen 6 being mounted within the housing 2. Said screen is spaced from one side wall of the housing 2 to provide a cotton passage leading downwardly to the upper end of the gage box, as will be obvious from Fig. 2. The partition 7 between the gage box 1 and conduit 4 extends to the bottom of the screen 6, and the opposite wall of the conduit 4 has an upper lip 8, or it can be said that said lip projects from the respective wall of the housing 2, so as to overlap the upper portion of the screen 6. The partition or wall 7 of the gage box opposite the cotton passage between the screen 6 and respective side wall of the housing 2 extends under and adjacent to the screen to said passage. The pump 5 sucks air downwardly through the screen 6 and conduit 4 from the conduit 3, thus sucking the cotton from the conduit 3 into the housing 2 and against the screen 6, and as said screen rotates (counter clockwise as seen in Fig. 2), the cotton is carried out of the current of air above the gage box, and drops into the gage box. The machine has a pair of feed rolls 9 at the lower end of the gage box for delivering the cotton from the gage box to a beater 10, and from this beater the cotton is brought to its finished state in the usual manner. The screen 6 is mounted upon a shaft 11 journaled through the ends of the housing 2, and having secured upon one end a pulley wheel 12 connected by a belt 13 to a pulley wheel 14 carried by a driving shaft 15.

The present distributer is designated generally at 16, and embodies a horizontal shaft 17 extending through the sides of the gage box 1 adjacent the upper end thereof and near the bottom of the screen, so that the axes of the screen and distributer are parallel and vertically spaced. Mounted upon the shaft 17 within the gage box are a plurality of hubs or collars 18 fastened to the shaft by set screws 19, or otherwise, and these hubs 18 are provided with oppositely projecting radial arms 20. Attached to the free ends of the arms of the two sets are longitudinal bars 21 parallel with the shaft 17, which work close adjacent to the screen 6 when the distributer is rotated, preferably in the direction of the arrow in Fig. 2. The shaft 17 is located below the upper end of the wall or partition 7 of the gage box, and the arms carried by said shaft work closely under said upper end of said wall and across the lower end of the cotton passage leading downwardly within the housing 2 to the upper end of the gage box. The distributer can be constructed differently than shown, and can be mounted for operation within the gage box in different manners. Attached to one outer end of the shaft 17 is a pulley wheel 22 connected by a belt 23 to a pulley wheel 24 secured upon the driving shaft 15, whereby the distributer is rotated when the screen is. It will be seen that the pulley wheel 23 is of smaller diameter than the pulley wheel 24, and that the pulley wheel 14 is of smaller diameter than the pulley wheel 12, so that the distributer will rotate considerably faster than the screen, and as indicated by the arrows in Fig. 2, the distributer and the screen rotate in the same direction, whereby the adjacent portions move in opposite directions. The shaft 17 is preferably journaled in bearings 25 attached to the sides of the gage box 1, and collars 26 can be secured upon the shaft 17 to bear against the bearings 25 to hold said shaft in place.

When the machine is in operation, the cotton in dropping from the screen 6 into the gage box will encounter the rotating distributer, which will break the cotton up into small flakes, and which will distribute the cotton so that it drops evenly throughout the width of the gage box. The cotton will therefore pass between the feed rolls 9 evenly, thus producing an even sheet of cotton, which is far superior to ordinary machines, wherein the cotton drops in chunks into the gage box in unevenly distributed manner. The cotton, with the use of the present distributer, will be of even density and distribution. The present distributer also results in the production of even laps, and eliminates what is known as soft-ended laps, caused by an uneven sheet of cotton. This evenness of lap, produced by the use of the distributer, will result in evener work being done in all subsequent machines operating upon the cotton, thus providing a much evener product, and consequently, evener yarn.

The present device enhances the blending or mixing of the cotton. It is ordinarily the case that no two bales of cotton, or cotton grown in the same field, produce an even length of staple, and consequently, the better the cotton is blended or mixed, the better results are gotten in the working of the stock. The blending of the cotton in a uniform manner, as accomplished by this device, results in additional strength being given the yarn.

In the modification illustrated in Fig. 4, the distributer embodies the shaft 17' having the radial arms 20' which are operable to break up and distribute the cotton.

Having thus described the invention, what is claimed as new is:

In a machine of the character described, an upright gage box, a screen housing at the upper end of said gage box, a rotatable cylindrical screen in said housing spaced from one side wall thereof to provide a cotton passage leading downwardly to the upper end of the gage box, the opposite wall of the gage box extending under and adjacent to said screen to said passage, a shaft rotatable in the gage box below the upper end of said wall of the gage box, and arms carried by said shaft to work closely under the upper end of said wall of the gage box and across the lower end of said passage away from said screen.

In testimony that I claim the foregoing as my own, I have hereto affixed my signature in the presence of two witnesses.

WALTER JAMES BRITTON.

Witnesses:
E. M. MATHEWES,
JNO. B. WARDLAW.